(12) United States Patent
Blades

(10) Patent No.: US 8,666,374 B2
(45) Date of Patent: Mar. 4, 2014

(54) METHOD AND SYSTEM COMPRISING MEANS TO TRANSMIT AN IMAGE OF A MESSAGE

(76) Inventor: Dian Blades, Gymea Bay (AU)

( * ) Notice: Subject to any disclaimer, the term of this patent is extended or adjusted under 35 U.S.C. 154(b) by 0 days.

(21) Appl. No.: 13/511,078

(22) PCT Filed: Nov. 24, 2010

(86) PCT No.: PCT/AU2010/001580
§ 371 (c)(1),
(2), (4) Date: May 21, 2012

(87) PCT Pub. No.: WO2011/066599
PCT Pub. Date: Jun. 9, 2011

(65) Prior Publication Data
US 2012/0231774 A1    Sep. 13, 2012

(30) Foreign Application Priority Data

Dec. 4, 2009 (AU) ................................ 2009905882

(51) Int. Cl.
*H04M 3/42* (2006.01)
(52) U.S. Cl.
USPC ........ 455/414.1; 342/619; 342/629; 342/636; 455/414.3; 455/414.4; 455/466; 715/273; 715/716; 715/864

(58) Field of Classification Search
None
See application file for complete search history.

(56) References Cited

U.S. PATENT DOCUMENTS

| 7,548,755 | B2 * | 6/2009 | Kim .............................. 455/466 |
| 2006/0015812 | A1 | 1/2006 | Cunningham et al. |
| 2006/0064652 | A1 | 3/2006 | Ahokas |
| 2006/0133340 | A1 | 6/2006 | Rybak |
| 2006/0200568 | A1 | 9/2006 | Kim |
| 2007/0176934 | A1 | 8/2007 | Toivola |
| 2007/0192737 | A1 | 8/2007 | Lee |
| 2007/0234231 | A1 * | 10/2007 | Lee ................................ 715/788 |
| 2008/0119235 | A1 | 5/2008 | Nielsen et al. |
| 2008/0280633 | A1 * | 11/2008 | Agiv ............................. 455/466 |
| 2010/0001959 | A1 * | 1/2010 | Kim .............................. 345/169 |

FOREIGN PATENT DOCUMENTS

| WO | WO 2007/040310 A1 | 4/2007 |
| WO | WO 2008/084993 A1 | 7/2008 |
| WO | WO 2008/107675 A1 | 9/2008 |
| WO | WO 2008/111699 A1 | 9/2008 |

OTHER PUBLICATIONS

International Search Report, Mar. 2, 2011, from International Phase of the instant application.

(Continued)

*Primary Examiner* — Charles Appiah
*Assistant Examiner* — Jaime Holliday

(57) ABSTRACT

A method and system applied on a mobile device comprising internal processing means to create an image of message wherein a screen capture means in the mobile device provides a single processing step in the mobile device comprising means to convert the entire contents of a displayed message and including a background to a single MMS compliant image in creating a multimedia picture message for transmission to a destination mobile device, wherein transmitting an image of a displayed message comprises executing a single instruction on the mobile device wherein executing the single instruction both activates the screen capture means in the mobile device in creating a single MMS compliant image of a displayed message and transmits the created image thereof as a multimedia picture message to a destination mobile device.

12 Claims, 10 Drawing Sheets

(56) References Cited

OTHER PUBLICATIONS

AU2010/200390 Australian Examination Report No. 1, Mar. 23, 2010, from application corresponding to instant application.
AU2010/200390 Australian Examination Report No. 2, Aug. 4, 2010, from application corresponding to instant application.
AU2010/200390 Australian Examination Report No. 3, Sep. 30, 2010, from application corresponding to instant application.
AU2010/200390 Australian Examination Report No. 4, Nov. 5, 2010, from application corresponding to instant application.
AU2010/200390 Australian Examination Report No. 5, Dec. 6, 2010, from application corresponding to instant application.
AU2010/200390 Australian Examination Report No. 6, Jan. 31, 201, from application corresponding to instant application.
AU2010/200390 Australian Examination Report No. 7, Mar. 9, 2011, from application corresponding to instant application.
AU2011/100773 Australian Examination Report No. 1, Aug. 17, 2011, from application corresponding to instant application.

* cited by examiner

| | A | | B | |
|---|---|---|---|---|
| Font Size | 18 | | 8 | 20 |
| Font Style | abc | ⌄ | 10 | 22 |
| Font Colour | ■ | ⌄ | 12 | 24 |
| Screen Colour | | ⌄ | 14 | 26 |
| Bold | off | ⌄ | 16 | 28 |
| Italics | off | ⌄ | 18 | 36 |
| Uppercase | on | ⌄ | | |
| Underline | off | ⌄ | | |

Highlight text by touch, then:

1. Select Options

2. Menu opens; Select Settings

3. Select Flexible Font

4. Edit message

Highlight text, then:

1. Select Options

2. Menu opens; Select Settings

3. Select Flexible Font

4. Edit message

Sample conventional menu on a non-touch screen mobile device 8, 10, 12, 14, 16, 18, 20, 22, 24, 26, 28, 36, 48

8, 10, 12, 14, 16, 18, 20, 22, 24, 26, 28, 36, 48

In accordance with the method of the present invention, a single image of an entire message is displayed on a destination mobile device.

FLOW CHARTS

METHOD AND SYSTEM COMPRISING MEANS TO TRANSMIT AN IMAGE OF A MESSAGE

A method and system to automatically display the contents of a message created on a first mobile device and including a background as an image on a second mobile device wherein the method and system comprises means to create an image of a message wherein the text within a created message for converting to an image selectively displays from the group comprising: a plurality of font designs, a plurality of font colours and a plurality of font sizes.

FIELD OF INVENTION

The present invention is directed to methods for creating/editing and delivering messages in a mobile communications network.

BACKGROUND OF THE INVENTION

In order for a text message to appear at a receiving mobile device in exactly the same way as it appears on the sending device, the same font or fonts used for sending the message must be installed on the receiving device. As this is not possible due to the many operating systems in use by different mobile device manufacturers, there have been complicated prior art workarounds devised to create and deliver messages comprising a plurality of fonts and colors, however significant limitations associated with these methods have prevented this wonderful concept from reaching the wider market including but not limited to the following wherein there exists a dependency on:
  i) The internet;
  ii) Additional server requirements;
  iii) High end operating systems including those that support a table and cell system/grid or table structure;
  iv) Mark up languages, for example, XML and HTML;
  v) Compatible operating systems;
  vi) Compatible programs;
  vii) Various complex software applications, for example those that encode and decode a message.

Instant messaging allows users to personalize messages, however instant messaging is an internet dependent real-time form of communication that is distinctly different to the widely used Short Message Service (SMS) and Multimedia Messaging Service (MMS).

The method of the present-invention is not disadvantaged by the above stated limitations and provides means to personally design a message comprising fonts and colors using even a conservative handset wherein internal processing means within a mobile device comprise means to locally execute the method. In particular, it is anticipated that the present invention will bring much enjoyment to the younger market who cannot afford high end devices with complex technology. Within its scope and at a time when the mail system is increasingly replaced by electronic means, the concept of creating multimedia message electronic greeting cards on a mobile device is further anticipated to have strong appeal within the entire mobile phone market.

In accordance with prior art, it is not possible to change the font features of selected input text within a message that is for transmission within a cellular network. It is only possible to select input text and change its attributes within a message that is to be file transferred as an email. This can be wherein both the sending and receiving device support a computer based operating system or wherein an operator has employed a text-based program to create a message. In using a text-based program, a created document must be saved and file attached to a message and sent as an email as Short Message Service and Multimedia Messaging Service do not support word document attachments.

In accordance with the present invention, a text-based program is not used to create a graphically expressive message. Alternate means to select graphics is devised wherein, in an exemplary embodiment, selectable graphics are incorporated in the settings of a mobile device within a menu structure that can be accessed from the mobile user interface. As this method avoids creating a word document attachment, a message does not have to be file transferred as an email. Furthermore, by avoiding the creation of an attachment, a message can be instantly displayed on a destination mobile device which is essential to the objective of creating emotion associated with special occasion messages. The method of file transfer devised in respect of another aspect of the present invention will be later described in detail and in comprising means to create an image of a message, irrespective of the message contents whatsoever, including messages comprising one of a picture and pictures as disclosed in Au2011202042 for the same invention, provides a solution to existing limitations that prevent the delivery of fonts and colors to a destination device wherein those fonts and colors are different to the system font and color or configuration of the destination device for receiving messages.

DEFINITIONS

"Mobile device" as used herein means: A mobile communication device or a portable or handheld computer comprising means to transmit a multimedia message including all manner of cellular or mobile phones, smart phones, tablets, laptops, mobile internet device, and pocket PC.

The term "image" as used herein refers to a Jpeg image or any other portable graphic file format that conforms to the MMS Standards.

"Text" or "textual information" is considered herein to be any written symbology that imparts information to a reader. While described herein in relation to English-language text using the Latin alphabet, the invention can be applied as well to other languages and symbologies. In addition, the invention can be employed with alphanumeric text, alphabetic text or numeric text.

"Set Format" means: a configuration for the display of textual information to be entered onto the text entry field used to create a message on a mobile device and for the display of received messages wherein the format is configured using selectable graphics within the settings of the mobile device accessible via the main menu and including a font design, font color, font size and optionally a background screen color.

SUMMARY OF INVENTION

The present invention advances over existing art, introducing unique means to graphically edit a message that is for transmission as a multimedia picture message on both a touch screen and non-touch screen mobile device wherein the attributes of selected input text within a message can be converted such that the text selectively displays from graphics comprising a plurality of font designs, a plurality of font colors and a plurality of font sizes and wherein the same selectable graphics can be used to configure a base display for entering text in creating a message. In converting text within a message, the selectable graphics can be used without limitation and a single message may be generated to comprise font features including a plurality of font designs, a plurality of font colors and a plurality of font sizes, including any one of, or any combination of the said pluralities. A background may be selected for inclusion within a created message and underline may be further included as an optional graphical feature. A text-based program is not used to create a message and in providing for the accurate display of a created message on a destination mobile device, an entire message comprising information entered by a user onto the input unit used to create a message on a sending mobile device and including a background is, within an exemplary embodiment, automatically converted to a single Jpeg image or other portable graphic file that conforms to the MMS Standards at the point of file transfer of the message wherein the image of a converted message forms an entire message on a destination mobile device and wherein, in creating an image of a message, it is not essential that the sending device is equipped with a digital camera.

EMBODIMENTS OF THE PRESENT
INVENTION ARE NOW DESCRIBED

Before explaining methods and embodiments of the present invention in detail, it is to be understood that the invention is capable of other embodiments or of being practiced or carried out in various ways including, but not limited to, providing means to execute the method wherein the selectable graphics are not stored within the settings of a mobile device, and that the phraseology and terminology used herein is for the purpose of description and should not be regarded as limiting. In providing means to execute the method, the system of the present invention may be configured within a mobile device or downloaded to a mobile device within a mobile application wherein the mobile application is one of an application that can modify and interact with the settings of the mobile device in providing means to execute the method and an application that comprises internal processing means to execute the method.

Figure 1:
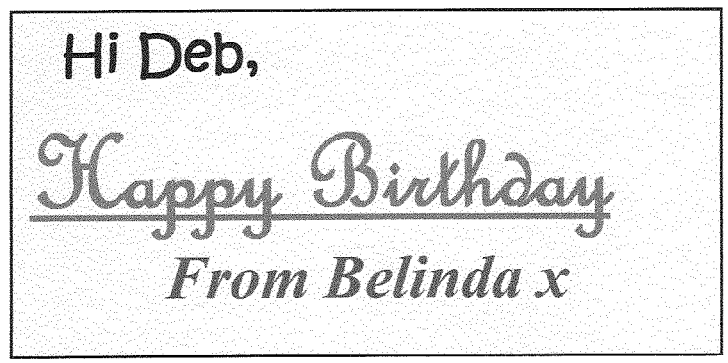
FIGS. 1, 2, 3 and 6 illustrate sample messages for display on a receiving device.
Figure 2:
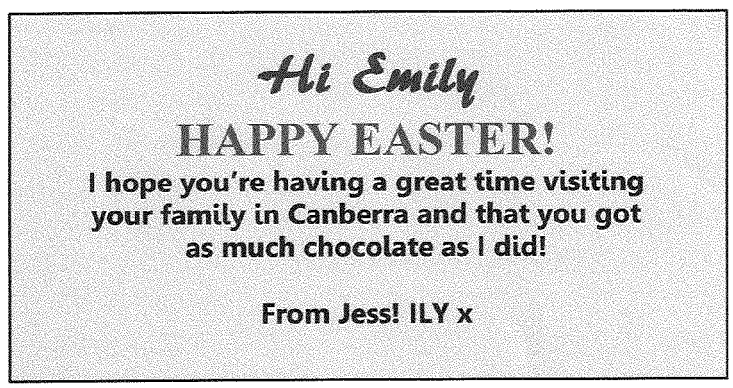
Figure 3:
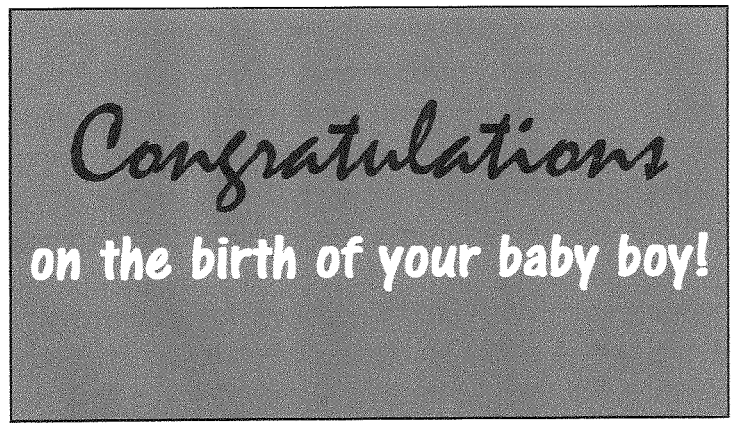

The present invention is of a method and system comprising means to:

1. Personally design a message on a mobile device as illustrated in FIGS. 1, 2 and 3 and as described within FIG. 15 and FIG. 18.

2. Convert a created message to an image at the point of file transfer of the message wherein the entire information entered by a user onto the text entry field used to create a message on a first mobile device is converted to a single Jpeg image or other portable graphic file for direct transmission as a multimedia message to a second mobile device within a cellular network.

3. Accurately display fonts and colors on a destination mobile device, regardless of type or model, wherein the destination mobile device only requires output means to render an image and wherein the same fonts and colors used to create a message on a sending mobile device may not be installed on the destination mobile device and wherein the method and system is independent of the requirement of a text-based program on both the sending and receiving devices, compatible operating systems, computer based operating systems, complex software applications, the internet and additional server requirements including those provided for by a font server.

4. Configure a mobile device with a base display as described within FIGS. 15 and 18 wherein this configuration is called 'Set Format'.

5. Separately configure all displays on a mobile device as described within FIGS. 16 and 19 wherein this configuration is called 'Display Set Format'.

6. Separately configure the dialing display of a mobile device to be used by an operator when making and receiving calls as described within FIGS. 17 and 20 wherein this configuration is called 'Call Display'.

Preferred means to design and position textual information within a message is now summarized:

i) A drop-down selector or a menu structure incorporating selectable graphics is, within an exemplary embodiment, configured within the settings of a mobile device and accessible via the main menu or a menu that is associated with a displayed message, for example, an options menu, wherein means is provided for an operator to select font features one or more times for inclusion within a single message;

ii) Means is provided to select graphics in one of converting the attributes of selected input text within a created message such that the text selectively displays from a plurality of font designs, a plurality of font colors and a plurality of font sizes and editing the font features of the base display or configuration of the mobile device to selectively display a font design, a font color and a font size, providing for the display of textual information to be entered onto the text entry field used to create a message;

iii) Touch sensitive means is provided on a touch screen mobile device to determine the location of, and to select input text within a created message that is to be converted to selectively display from a plurality of font designs, a plurality of font colors and a plurality of font sizes;

iv) Means is provided to determine the location of input text within a message on a non-touch screen mobile device at a curser wherein the space bar provides means to position the cursor at any location across the text entry field used to create a message and the directional keypad provides means to position the cursor onto any line within the same text entry field. It is further devised that a dedicated keystroke is activated at a cursor and before an operator uses the directional keypad in providing means to select text within a created message that is to be converted to selectively display from a plurality of font designs, a plurality of font colors and a plurality of font sizes.

FIGS. 15 and 18 and FIGS. 10 and 11 illustrate preferred means to access selectors for the purpose of designing a message using either a touch screen or a non-touch screen mobile device wherein a drop-down selector as described in the user interface description of Example 1 or a menu structure as described in the user interface description of Example 2 is provided.

An exemplary method of creating a message is now described.

Figure 4:
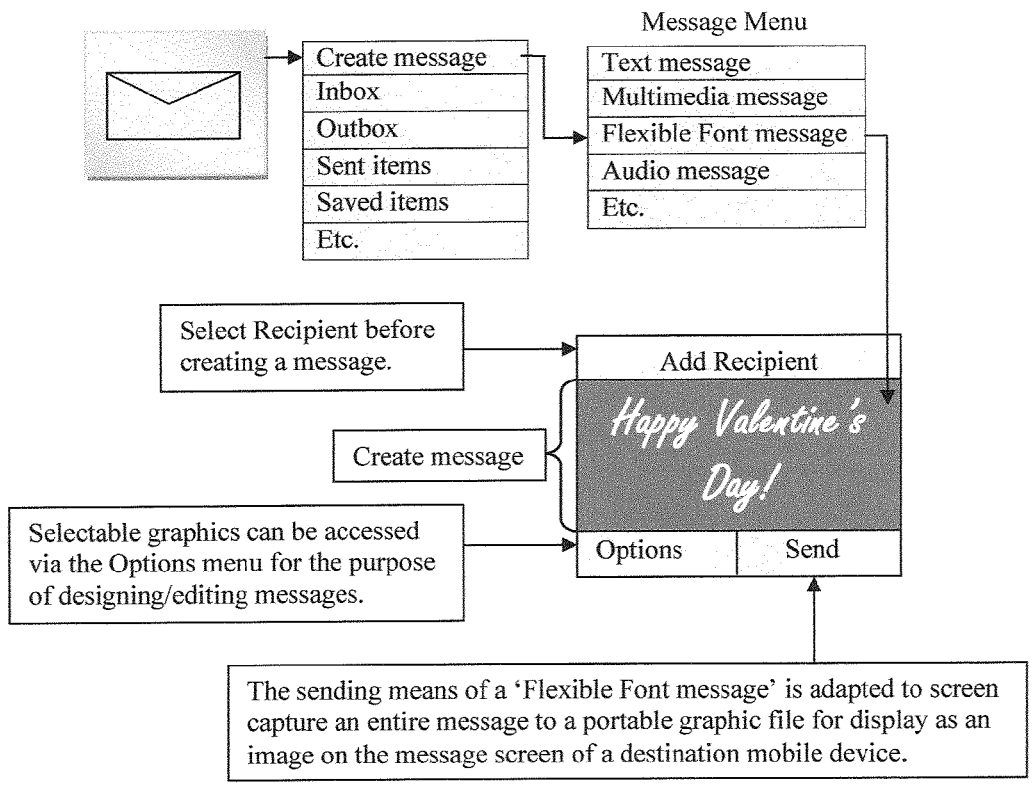
FIG. 4 illustrates a dedicated means to create a message, whereby a created message is automatically converted to an image when the message is sent.

To initiate the creation of a message, an operator may enter the input field used to create a message on a mobile device via for example the main menu wherein a dedicated means to create a message is provided as illustrated within FIG. 4 and named as a 'Flexible Font message' menu item. This menu item provides for the creation of a message, named as a 'Flexible Font message' for the purpose of reference, that is to be automatically displayed as an image on a destination mobile device when the instruction to send the message is executed. Selected textual information within a created message can be graphically edited such that the text selectively displays from a plurality of font designs, a plurality of font colors and a plurality of font sizes and the message may further comprise a selected background. In providing for the display of a message as an image on a destination mobile device, the sending means of a 'Flexible Font message' is adapted to automatically capture an entire message, including either a selected or the base display/default background, to a single Jpeg image or other portable graphic file that conforms to the MMS Standards. It is preferred that a message is transmitted to a recipients phone number previously designated by a user and that an output device will receive an error notification in the rare case of an input device being unable to render an image.

Figure 6:
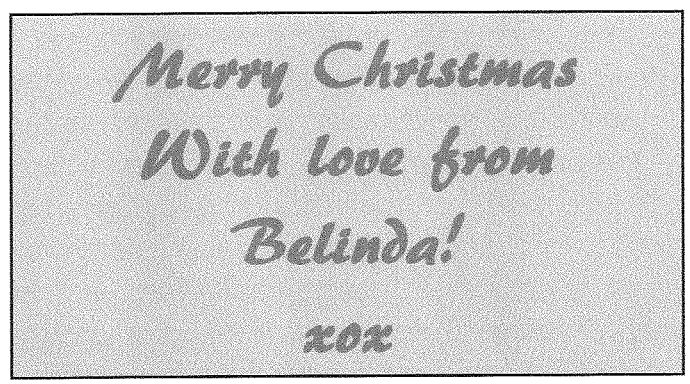

Whilst the method of converting text provides means to design special occasion or fun messages for display on a destination mobile device, it is to be understood that the 'Set Format' (base display) can be configured to provide the same. An example may be wherein an operator edits the font features of textual information to be entered onto the input field used to create a message in selecting via for example the main menu and before creating a message: 1) a red font; 2) 'Ar Berkley' font style, 3) size 28 font; and, 4) a green background, enters text (Merry Xmas) in creating a message as illustrated in FIG. 6 and then transmits the message as an image without converting any text. Similarly, it is to be understood that a base display selected by using an application in creating a message also provides means to design special occasion or fun messages for display on a destination mobile device without converting any text.

Figure 5:
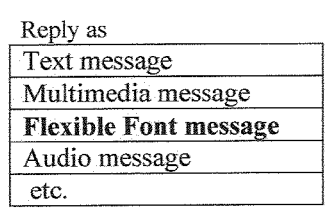
FIG. 5 illustrates means to automatically transmit an image of a message in reply to a received message, created and transmitted according to FIG. 4.

As an operator is not limited to system factory set colors for creating messages and for the display of received messages, this feature additionally provides assistance to people who have difficulty in reading certain color combinations who may experiment with fonts and colors in editing the display of textual information to be entered within messages. When a conventional SMS message is created and the 'Flexible Font message' means to create a message is not employed, the message will be transmitted as a SMS message and rendered according to the display settings of a destination mobile device, irrespective of the format of the message created on the sending mobile device. FIG. 5 illustrates that the reply menu in accordance with the present invention also comprises means for an operator to reply to an incoming message with a 'Flexible Font message'.

Figures 12, 13, 14:
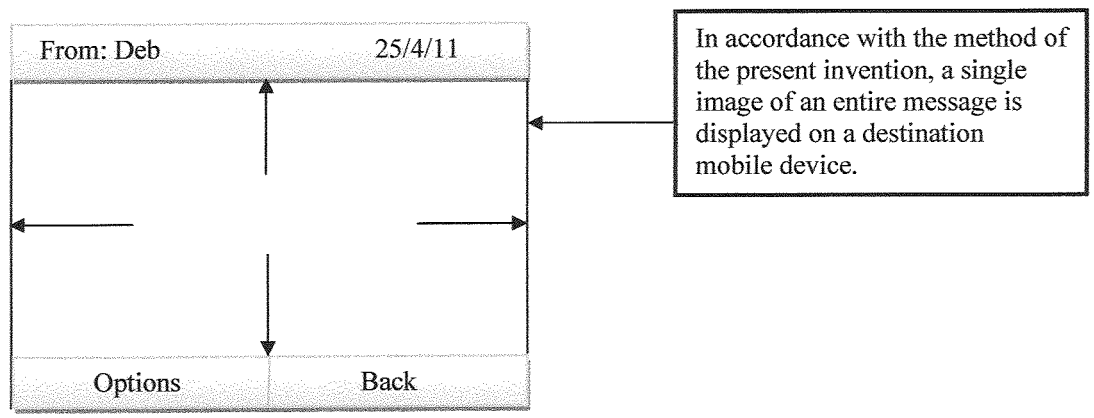
FIG. 12 illustrates sample font sizes.
FIG. 13 illustrates boldface fonts.
FIG. 14 illustrates wherein an image of a message may occupy the entire message display field on a receiving device.

Means to instantly display a captured message in accordance with the present invention is now described. According to prior art, in creating a multimedia message, an operator starts by creating a text message. When a subject is added or a photo, video or other attachment is included, the message becomes a multimedia message. US2006/0200568 discloses a method of converting a SMS message to a MMS compliant image without adding a picture, however in accordance with this prior art, a converted message is not instantly displayed on a destination mobile device and is instead limited to transmission only as a MMS attachment. According to the method of the present invention, it is devised that an entire message, including a background, is instantly displayed on a destination mobile device wherein the image of a converted message may occupy the entire message display field as illustrated in FIG. 14. In achieving this objective, a screen capture means cooperates exclusively with a volatile memory that is associated with the input field used to create a message in temporarily storing a converted message in the random access memory of a mobile device and also with a transceiver for sending messages. This process provides means to avoid a message being sent to underlying slower storage and for the processor to be able to interpret data and deliver it in an unaltered state. In yet another embodiment, it is devised that the process of converting a message to an image can be executed completely within the volatile memory.

As the means to convert an entire message to a single Jpeg image or other portable graphic file is, within an exemplary embodiment, incorporated within the means to send a message, a single command/instruction on the mobile device provides means to execute the conversion means and the message transmission. It is to be understood however, that the present invention is not limited by a single instruction or by the requirement of a dedicated means to create and send a message.

The screen capture method or other image conversion software may also be optionally used independently of the described means to send a Flexible Font message in creating a Jpeg image or other portable graphic file of a message. As an example, an image of a created message may be saved to memory (for example, to an image folder) and attached in an MMS message if a user so desires.

The concept of this new method of file transfer is augmented when one considers that it makes possible the display of stylus or digital pen handwritten messages that are not in the form of an attachment, which may promote communication in foreign language in the absence of foreign language applications on mobile devices as well as bring further enjoyment to the market in general. Similarly, if a non-Latin language application is used to create a message, this inventive method of file transfer negates the requirement for a receiving device to have a compatible program or non-Latin character recognition firmware or software in order to render a message.

Whilst a screen capture or screenshot method, used to create a Jpeg image or other portable graphic file of a message is disclosed as a preferred method of creating an image of a message, it would be understood by those skilled in the art that other means for converting a message to an image may be employed without departing from the scope of the invention including PDF conversion means, comprising means to convert/capture a message to a portable document file.

User interface examples are now described

EXAMPLE 1

This example describes a touch screen user interface wherein a drop-down selector is used to provide means to execute the method of the present invention.

Feature Number 1:
Drop-Down Selector

Figures 7, 8:
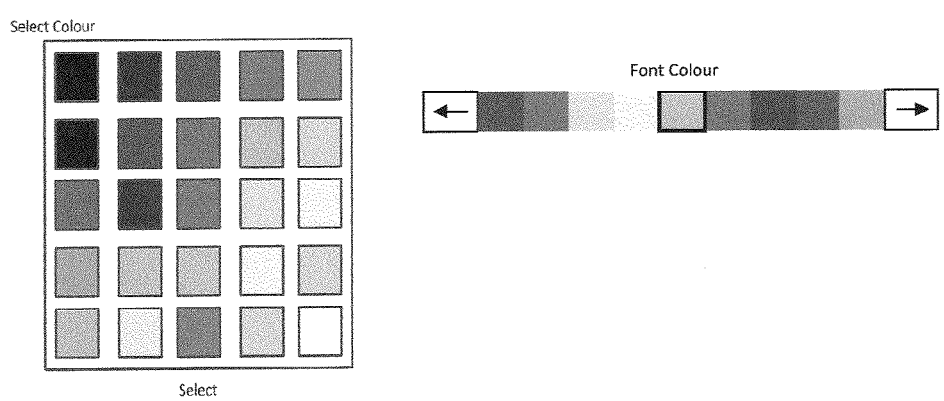
FIG. 7 illustrates a Drop-Down Selector comprising means to edit a message.
FIG. 8 illustrates a sample color selector.

In accordance with Example 1, a drop-down selector, as illustrated in FIG. 7, provides means to execute the method of the present invention on a touch screen mobile device. When embodied within the settings of a mobile device, selectors within the drop-down selector comprising selectable graphics and including a i) font size selector, ii) font style selector; iii) font color selector; iv) screen or background color selector; v) boldface selector, vi) italics selector; vii) uppercase selector; and, viii) underline selector, may be used by an operator for the purpose of both configuring a mobile device with a base display and for the purpose of graphically editing textual information within a message wherein, in both cases, selectable graphics may, be used to display textual information, numbers, punctuation marks and symbols.

Figure 9:
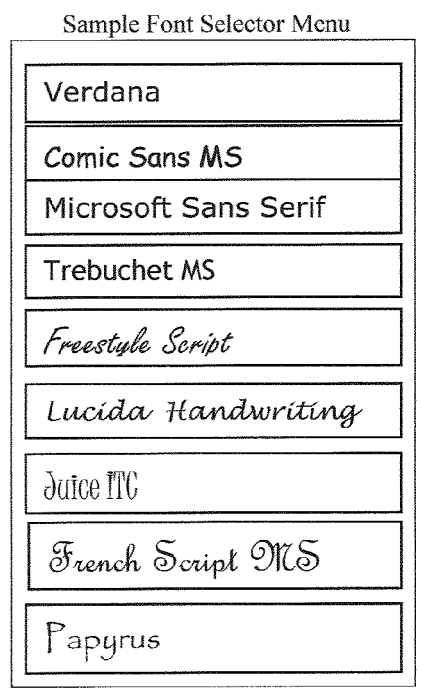
FIG. 9 illustrates a sample font style selector.

FIG. 12 illustrates a range of font sizes that may be included in a preferred embodiment wherein different font sizes may be numerically represented within a selector that is structured similar to the color selectors as illustrated in FIG. 8. FIG. 9 illustrates a sample font style selector that may form part of the present invention, wherein to identify different fonts, several characters reflecting a particular font style or alternatively, the names of different font styles are displayed. Any Microsoft fonts that are employed will only be those that are available for license. FIG. 13 illustrates sample boldface fonts that may be included in a preferred embodiment.

Figure 15:
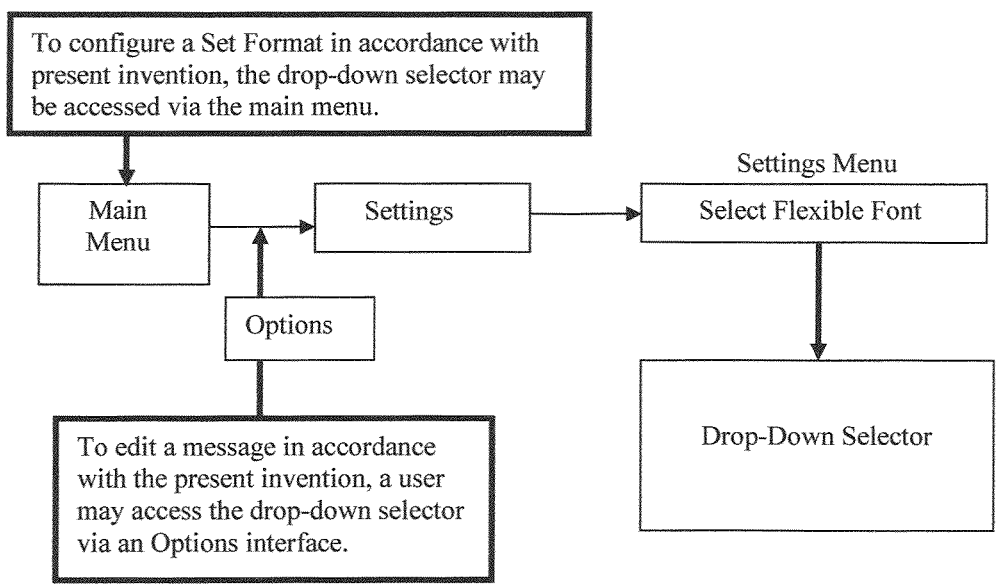
FIGS. 15-20 illustrate using selectable graphics to either edit a message or to configure a mobile device.
Figure 16:
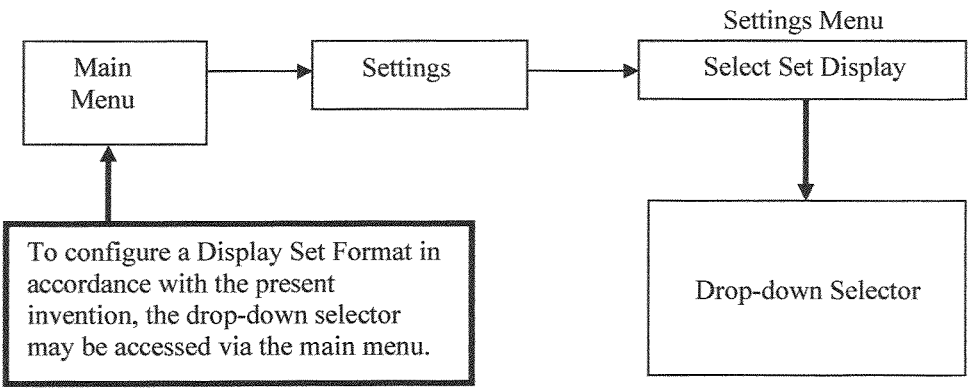
Figure 17:
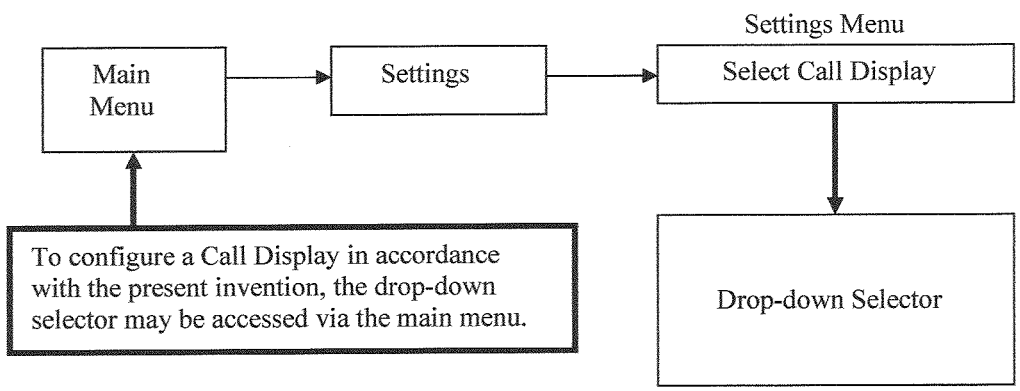

FIGS. 15, 16 and 17 illustrate preferred means to allow an operator to access the described drop-down selector for the purpose of configuring a mobile device with a 'Set Format', a 'Display Set Format' and a 'Call Display'. In providing for these separate configurations, dedicated settings menu items provide independent means for an operator to open the drop-down selector, which settings menu items are further described as features numbered 2, 3 and 4 within this user interface description.

FIG. 15 further illustrates preferred means to allow an operator to access the described drop-down selector for the purpose of designing/editing messages.

In describing the preferred operation of the drop-down selector, an operator may first choose a selector, for example 'Font Size', then Part A as illustrated in FIG. 7 will exit the screen and Part B as illustrated in FIG. 7 will be displayed; when a selection is made from Part B, Part B will exit the screen and Part A will be redisplayed for further consecutive selections to the same selected text, providing for, if desired by an operator, all of the selected text to be converted to display a single selected font style, a single selected font color and a single selected font size. This feature, as would be understood by a person skilled in the art, is consistent with the method of highlighting text in editing a message and provides flexibility to an operator in designing fonts. An operator may clear Part A from the screen by selecting 'back'. It is desirable that the drop-down selector may be dragged in any direction within a display screen to the extent that only a part of the selector remains visual and it is further desirable that the drop-down selector can be minimized.

Feature Number 2:
Flexible Font—Settings Menu Item

This menu item, which opens to display the described drop-down selector, may be accessed directly via the main menu for the purpose of configuring a mobile device with a 'Set Format' or accessed via an options interface associated with a displayed message in providing for when an operator is designing a message.

Feature Number 3:
Set Display—Settings Menu Item

This menu item; which opens to display the described drop-down selector, may be accessed directly via the main menu for the purpose of configuring a mobile device with a 'Display Set Format'. Displays include name lists, inbox, sent and saved messages, missed and received calls, message recipients, phone numbers, menus and other displays or lists that a phone may have. It is preferred that a mobile device will be configured to identify if a selected font size is too large to use within the 'Display Set Format' and in remedy of this, an automatic default to a smaller size will be executed, providing for the largest size that may be used without causing a broken display to be employed.

Feature Number 4:
Call Display—Settings Menu Item

This menu item, which opens to display the described drop-down selector, may be accessed directly via the main menu for the purpose of configuring a mobile device with a 'Call Display'.

Optional Feature Number 5:
Screen Brightness Control
Optional Feature Number 6:
Screen Contrast Control

EXAMPLE 2

Figure 11:
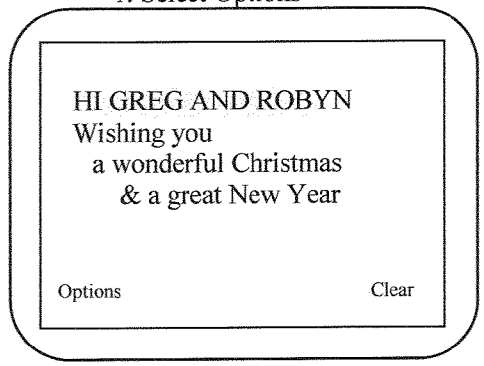
Figure 11:
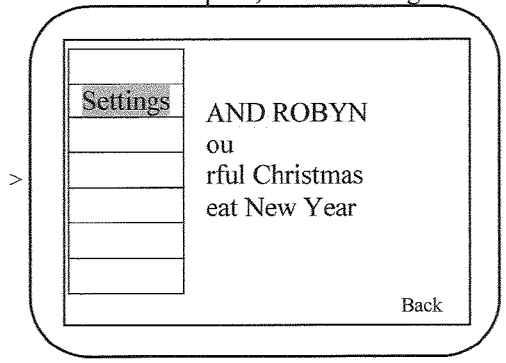
Figure 11:
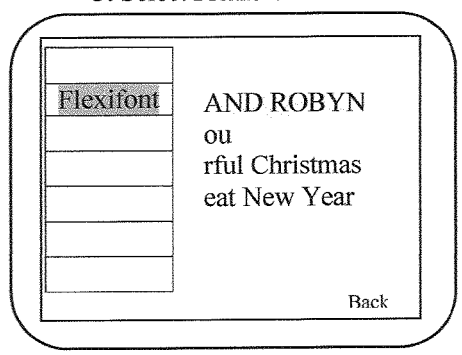
Figure 11:
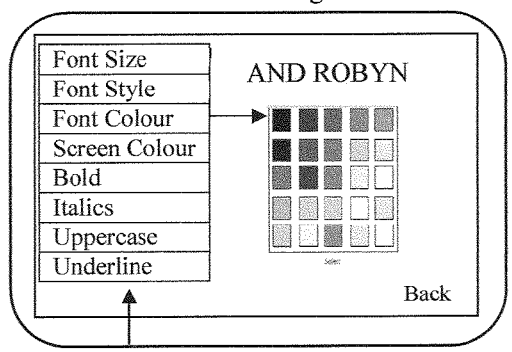

This example describes both a touch screen and non-touch screen user interface wherein a drop-down selector is not used to provide means to execute the method of the present invention. In accordance with the user interface of Example 2 and as illustrated in FIG. 11, a sub-menu within a conventional menu structure is configured to comprise the same selectable graphics as described within Example 1. When embodied within the settings of a mobile device, selectors comprising selectable graphics, may be used by an operator for the purpose of both configuring a mobile device with a base display and for the purpose of graphically editing textual information within a message wherein, in both cases, selectable graphics may be used to display textual information, numbers, punctuation marks and symbols.

Figure 10:
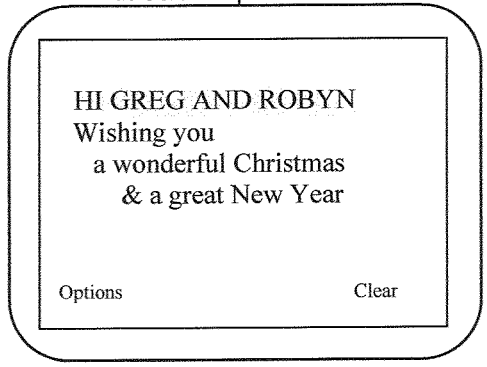
FIGS. 10 and 11 illustrate means to edit messages using selectable graphics on a touch screen and a non-touch screen mobile device respectively.
Figure 10:
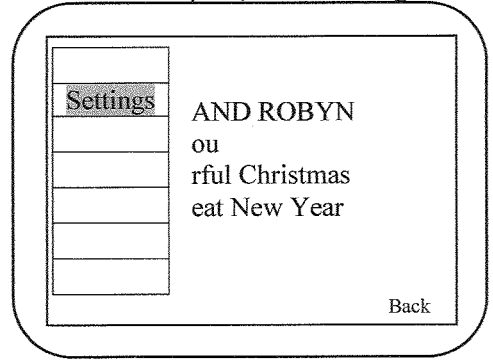
Figure 10:
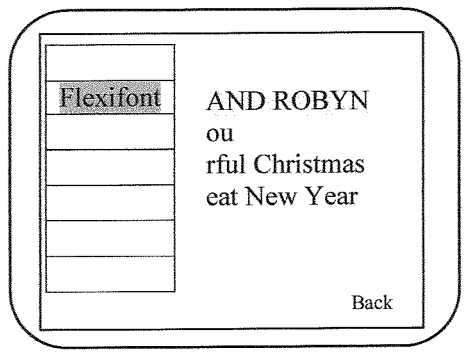
Figure 10:
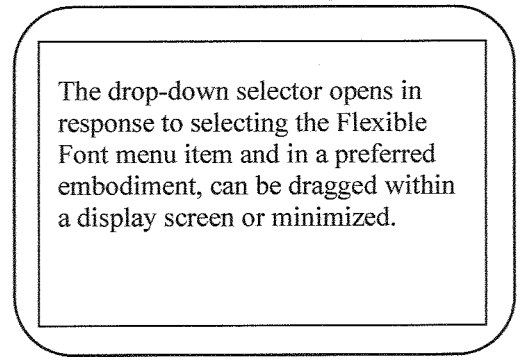
Figure 18:
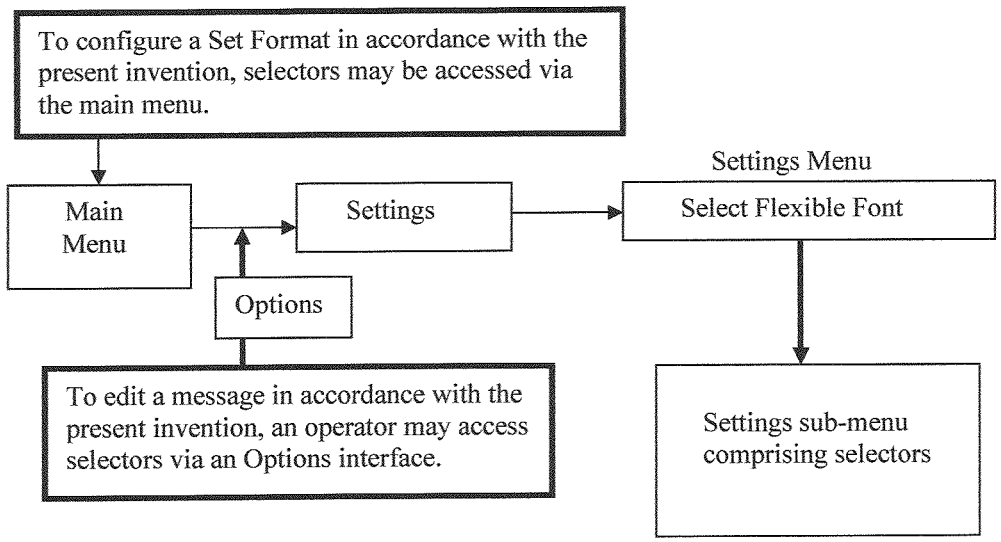
Figure 19:
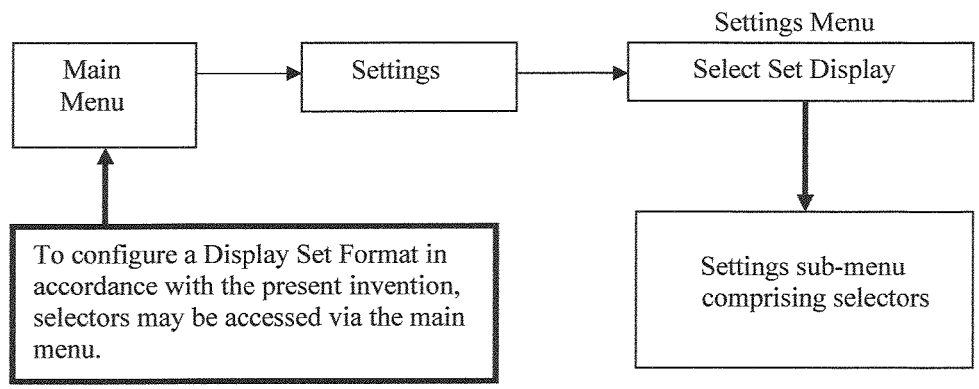

FIGS. 18, 19 and 10 illustrate preferred means to allow an operator to access selectable graphics for the purpose of configuring a mobile device with a 'Set Format', a 'Display Set Format' and a 'Call Display'. In providing for these separate configurations, dedicated settings menu items provide independent means for an operator to open the selectors, which settings menu items are further described as features numbered 11, 12 and 13 within this user interface description and which settings menu items are consistent with those disclosed and operable within Example 1 for the same purpose.

FIG. 18 further illustrates preferred means to allow an operator to access selectors for the purpose of designing/editing messages.

The same selectable graphics as disclosed within Example 1 are provided as follows.

Feature Number 1:
Font Size Selector

FIG. 12 illustrates a range of font sizes that may be included in a preferred embodiment wherein different font sizes may be numerically represented within a selector that is structured similar to the color selectors as illustrated in FIG. 8.

Feature number 2:
Font Style Selector

FIG. 9 illustrates a sample font style selector that may form part of the present invention, wherein to identify different fonts, several characters reflecting a particular font style or alternatively, the names of different font styles are displayed. Any Microsoft fonts that are employed will only be those that are available for license.

Feature Number 3:
Font Color Selector
FIG. 8 illustrates sample font color selectors that may form part of the present invention.
Feature Number 4:
Screen Color Selector
FIG. 8 illustrates sample screen color selectors that may form part of the present invention.
Feature Number 5:
Boldface Selector
FIG. 13 illustrates sample boldface fonts that may be included in a preferred embodiment.
Feature Number 6:
Italics Selector
Feature Number 7:
Uppercase Selector
Feature Number 8:
Underline Selector
Optional Feature Number 9:
Screen Brightness Control
Optional Feature Number 10:
Screen Contrast Control
Feature Number 11:
Flexible Font—Settings Menu Item
This menu item, which opens to display the selectors of the present invention, may be accessed directly via the main menu for the purpose of configuring a mobile device with a 'Set Format' or accessed via an options interface associated with a displayed message in providing for when an operator is designing a message.
Feature Number 12:
Set Display—Settings Menu Item
This menu item, which opens to display the selectors of the present invention, may be accessed directly via the main menu for the purpose of configuring a mobile device with a 'Display Set Format'. Displays include name lists, inbox, sent and saved messages, missed and received calls, message'recipients, phone numbers, menus and other displays or lists that a phone may have. It is preferred that a mobile device will be configured to identify if a selected font size is too large to use within the 'Display Set Format' and in remedy of this, an automatic default to a smaller size will be executed, providing for the largest size that may be used without causing a broken display to be employed.
Feature Number 13:
Call Display—Settings Menu Item
This menu item, which opens to display the selectors of the present invention, may be accessed directly via the main menu for the purpose of purpose of configuring a mobile device with a 'Call Display'.

Other Preferred Features of Example 1 and Example 2

The system and method of the present invention providing for:
1. On-Screen direct link to the drop-down selector of Example 1;
2. On-screen or keypad selectors that are linked to the settings of a mobile device;
3. On-screen or keystroke case directive;
4. Horizontal display screen viewing;
5. A method to print messages.

Other Optional Features of Example 1 and Example 2

The system and method of the present invention providing for:
1. The inclusion of additional selectors, accessible via an options menu associated with a displayed message and including:
i) 'Replace font color' selector:
Comprising means within the described color selector of the present invention to change. all text of a particular color within a message wherein means is provided for an operator to select two colors, the first selected color being a color that is to be changed and the second selected color being a replacement color.
ii) 'MCF' font selector:
Comprising a plurality of multiple colored fonts.
iii) Background selector:
Comprising additional background selectors providing for special effect within messages including color combinations, shading, textures and patterns.
iv) Border selector:
Comprising means to insert a border of a selected style to a message which will be rendered in the same color as a selected background. The border selector may further comprise a link to color and size selectors, providing for variations to the display of a selected border.
v) Audio selector.
Comprising means to insert an audio file to accompany a message including the following selectable options.
Insert file:
Providing means to insert an audio file including songs such as Happy Birthday stored within a personal folder on a mobile device;
Record voice message:
Providing means to insert a personal voice recording.
vi) Variation to underline selector:
Additionally comprising a link to: i) the font color selector wherein a single underline color may be selected; and, ii) the font size selector wherein variations other than bold can be made to the size of underlining.
2. A method to create and transmit multiple page graphically expressive captured messages formed in accordance with the method of the present invention.
3. An Internet synchronized interface enabling an operator to download software upgrades to allow for improvements, for example, the addition of new fonts to selectors.
4. An interface between:
i) email and the selectors of the present invention, providing for the creation of graphically expressive emails independent of the requirement of a computer based operating system on both the sending and receiving device and also optionally providing for an independent email 'Set Format'; and,
ii) email and the described 'Flexible Font message' method of file transfer wherein a created email may be transmitted as an image.
5. A method to delete the last change to edited text.
6. A method to highlight an entire message, providing for a selected graphic to be applied to an entire message.
7. On-Screen/keypad font size control:
A dedicated key or touch button may provide a quick and visual means for an operator to change the configured font size that is used as a base display for creating messages. It is devised that activating this control will cycle a display of characters reflecting different font sizes within the display screen of a mobile device and that when the control is released, the last displayed font size will be automatically configured to the 'Set Format' of a mobile device.

8. Optical Recognition Software that can interpret an image and convert it to a text file that can be edited, providing for an operator to edit an incoming 'Flexible Font message' for return to a sending operator.
9. A settings menu option to configure the described Drop-Down selector of Example 1 to a larger or smaller size.
10. An interface between selectors and other software on a mobile device, for example a calendar display.
11. Touch screen stylus or digital pen operated means to create handwritten messages.
12. A method to color code incoming messages so as to reflect the identity of a sending operator.
13. A method to save received captured messages to a file folder associated with messaging.
14. A method to save created captured messages to a file folder associated with messaging.
15. Software interface with Windows Live Messenger, MySpace and Face book.

Although this invention has been described in language specific to features and methods, it is to be understood that the invention defined in the appended claims is not necessarily limited to the specific features or acts described. Rather, the specific features and acts are disclosed as exemplary forms of implementing the claimed invention. While only certain examples are given, a person skilled in the art will appreciate that many other interfaces and related techniques can be implemented without departing from the scope of the invention. As used in the appended claims, the singular forms "a", "an" and "the" are intended to include the plural forms as well, unless the context clearly indicates otherwise. It will be further understood that the terms "comprises" and/or "comprising" specify the presence of stated features but do not preclude the presence or addition of one or more other features.

The invention claimed is:

1. A method of creating a multimedia picture message on a mobile device for transmission to a destination mobile device wherein a single processing step in the mobile device comprises means to convert the entire contents of a displayed message on the mobile device and including a background to a single MMS compliant image in creating a multimedia picture message for transmission to said destination mobile device wherein the displayed message for converting to said single MMS compliant image is displayed on a message screen on the mobile device wherein said message screen comprises means to display one of a SMS message and a MMS message, the mobile device comprising a user interface and a display screen and comprising internal processing means to create an image of a message, said method comprising the steps of:

(a) Providing a screen capture means in the mobile device, wherein said single processing step in the mobile device comprises means to convert the entire contents of said displayed message on the mobile device and including a background to said single MMS compliant image wherein the entire message displayed on the mobile device is converted to an image format and wherein said displayed message for converting to said single MMS compliant image is displayed on said message screen on the mobile device, comprising means to display one of a SMS message and a MMS message;

(b) Providing means in the mobile device to transmit said single MMS compliant image of said displayed message as a multimedia picture message to said destination mobile device wherein the means in the mobile device to transmit said single MMS compliant image of said displayed message as a multimedia picture message to said destination mobile device comprises means to execute a single instruction on the mobile device wherein executing said single instruction on the mobile device both activates the screen capture means of said step (a) in converting the entire contents of said displayed message on the mobile device and including a background to said single MMS compliant image and transmits the created image thereof as a multimedia picture message to said destination mobile device;

(c) Activating the screen capture means of said step (a) in converting the entire contents of said displayed message on the mobile device and including a background to said single MMS compliant image;

(d) Transmitting said created image of said displayed message as a multimedia picture message to said destination mobile device whereby the message can be viewed as an image on the display screen of the destination mobile device, wherein transmitting said created image of said displayed message on the mobile device comprises executing the single instruction of said step (b) in both activating the screen capture means of said step (a) in converting the entire contents of said displayed message and including a background to said single MMS compliant image and transmitting the created image thereof as a multimedia picture message to said destination mobile device.

2. The method of claim 1 wherein said step (d) of transmitting said created image of said displayed message, created according to the method of said step (c), as a multimedia picture message to said destination mobile device comprises executing sending means on the mobile device in transmitting said created image of said displayed message as a multimedia picture message to said destination mobile device.

3. The method of claim 1 wherein said displayed message for converting to said single MMS compliant image is a newly composed message.

4. The method of claim 1 wherein said displayed message for converting to said single MMS compliant image comprises textual information wherein the textual information within the displayed message selectively displays from the group comprising: a plurality of font designs, a plurality of font colours and a plurality of font sizes.

5. The method of claim 1 wherein said displayed message for converting to said single MMS compliant image comprises one of textual information and one of a picture and pictures, and, a plurality of pictures wherein a picture within the displayed message is one of a: photograph, graphic illustration, emoticon, speech bubble, or combination thereof.

6. The method of claim 1 wherein said displayed message for converting to said single MMS compliant image comprises textual information and one of a picture and pictures wherein the textual information within the displayed message selectively displays from the group comprising a plurality of font designs, a plurality of font colours and a plurality of font sizes and wherein a picture within the displayed message is one of a: photograph, graphic illustration, emoticon, speech bubble, or combination thereof.

7. The method of claim 1 wherein the background of said displayed message for converting to said single MMS compliant image is one of a default background and a selected background.

8. A system applied on a mobile device comprising a user interface and a display screen and comprising internal processing means to create an image of a message, wherein the system comprises a single processing means in the mobile device, comprising means to convert the entire contents of a displayed message on the mobile device and including a background to a single MMS compliant image in creating a multimedia picture message for transmission to a destination mobile device wherein said displayed message for converting to said single MMS compliant image is displayed on a message screen on the mobile device wherein said message screen comprises means to display one of a SMS message and a MMS message, said system comprising:

(a) A screen capture means in the mobile device, wherein said single processing means in the mobile device comprises means to convert the entire contents of said displayed message on the mobile device and including a background to said single MMS compliant image wherein the entire message displayed on the mobile device is converted to an image format and wherein said displayed message for converting to said single MMS compliant image is displayed on said message screen on the mobile device, comprising means to display one of a SMS message and a MMS message;

(b) An input unit on the mobile device, comprising means to allow a user to enter information onto the display screen of the mobile device in composing said message;

(c) A display unit on the mobile device, comprising means to display said message;

(d) An output unit on the mobile device, comprising means to output to the user said created single MMS compliant image of said displayed message;

(e) A memory in the mobile device, comprising means to store information comprising said created single MMS compliant image of said displayed message;

(f) Sending means in the mobile device, comprising means to transmit said created single MMS compliant image of said displayed message as a multimedia picture message to said destination mobile device;

(g) A single executable instruction on the mobile device wherein said single executable instruction on the mobile device is executable to both activate said screen capture means in the mobile device, comprising means to convert the entire contents of said displayed message on the mobile device and including a background to said single MMS compliant image, and to transmit the created image thereof as a multimedia picture message to said destination mobile device.

9. The system of claim 8 further comprising selectable graphics for selecting to include in a message in composing said message for converting to said single MMS compliant image.

10. The system of claim 8 wherein said input unit on the mobile device, comprising means to allow a user to enter information onto the display screen of the mobile device in composing said message, is adapted to input information comprising multiple contents including one of textual information and one of a picture and pictures, and, a plurality of pictures wherein a picture is one of a: photograph, graphic illustration, emoticon, speech bubble, or combination thereof.

11. The system of claim 8 further comprising a dedicated means to create said message on the mobile device wherein said dedicated means to create said message on the mobile device is associated with said single executable instruction on the mobile device, wherein said single executable instruction is executable to both convert the entire contents of said displayed message on the mobile device and including a background to said single MMS compliant image and to transmit the created image thereof as a multimedia picture message to said destination mobile device.

12. The system of claim 8 wherein the mobile device is one of a mobile communication device and a mobile computer comprising means to transmit a multimedia message.

* * * * *

UNITED STATES PATENT AND TRADEMARK OFFICE
CERTIFICATE OF CORRECTION

| | | |
|---|---|---|
| PATENT NO. | : 8,666,374 B2 | Page 1 of 1 |
| APPLICATION NO. | : 13/511078 | |
| DATED | : March 4, 2014 | |
| INVENTOR(S) | : Dian Blades | |

It is certified that error appears in the above-identified patent and that said Letters Patent is hereby corrected as shown below:

In the Specification

The paragraph beginning with 'A method and system' on Line 5, Column 1 and ending with 'a plurality of font sizes' at Line 12, Column 1 should be deleted.

Column 1, Line 48 reads
'The method of the present-invention is not disadvantaged' and should instead read
'The method of the present invention is not disadvantaged'.

Column 8, Line 3 reads
'This menu item; which opens to display the described' and should instead read
'This menu item, which opens to display the described'.

Figure 20:
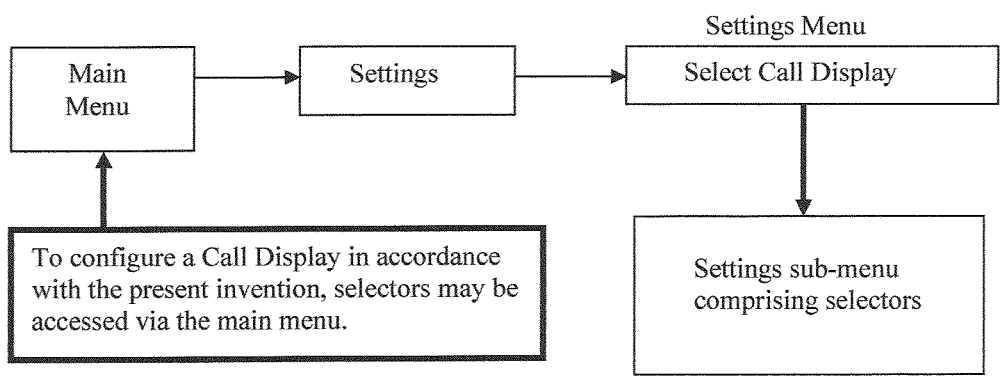

Column 8, Line 42 reads
'FIGS. 18, 19 and 10 illustrate preferred means to allow an' and should instead read
'FIGS. 18, 19 and 20' illustrate preferred means to allow an'.

Column 9, Line 43 reads
'message'recipients, phone numbers, menus and other dis-' and should instead read
'message recipients, phone numbers, menus and other dis-'.

Column 10, Line 13 reads
'the present invention to change. all text of a particular' and should instead read
'the present invention to change all text of a particular'.

Column 10, Line 30 reads
'v) Audio selector.' and should instead read
'v) Audio selector:'.

Signed and Sealed this
Twentieth Day of May, 2014

Michelle K. Lee
*Deputy Director of the United States Patent and Trademark Office*